April 28, 1953 G. BOUYOUCOS 2,636,962
SOIL MOISTURE METER
Filed May 24, 1949 2 SHEETS—SHEET 1

INVENTOR.
George Bouyoucos.
BY
Richard A. Parsons
ATTORNEY.

April 28, 1953     G. BOUYOUCOS     2,636,962
SOIL MOISTURE METER

Filed May 24, 1949     2 SHEETS—SHEET 2

INVENTOR.
George Bouyoucos.
BY
Richard A. Parsons
ATTORNEY.

Patented Apr. 28, 1953

2,636,962

UNITED STATES PATENT OFFICE 2,636,962

SOIL MOISTURE METER

George Bouyoucos, East Lansing, Mich., assignor to Michigan State Board of Agriculture, East Lansing, Mich., a corporation of Michigan Application May 24, 1949, Serial No. 95,101

3 Claims. (Cl. 201—63)

This invention relates to apparatus for determining the moisture content of soils.

This application is continuation in part of my prior application Serial No. 22,812, filed April 23, 1948, now abandoned, for a Soil Moisture Meter.

In the study of growing plants by horticulturists and plant physiologists, it is extremely necessary that a suitable means for determining soil moisture content be utilized. It is also desirable that a simple and accurate device be available for use by commercial plant growers to determine when it is necessary to irrigate the soil in which their crops are growing. This is particularly necessary in areas in which irrigation is necessary. Previous devices for determining soil moisture content have not been satisfactory for a number of reasons.

The present invention provides a simple and convenient apparatus for determining the moisture content of various soils. It is easily calibrated and once it has been calibrated its calibration remains constant. That has not been true of previous devices of this character.

Accordingly, the principal object of the present invention is to provide a simple, convenient and accurate apparatus for determining soil moisture content.

Another object is to provide such an apparatus, the calibration of which will remain constant.

These objects, as well as others ancillary thereto, will appear more fully in the following specification, when read in connection with the accompanying drawings, wherein.

Figures 1, 2:
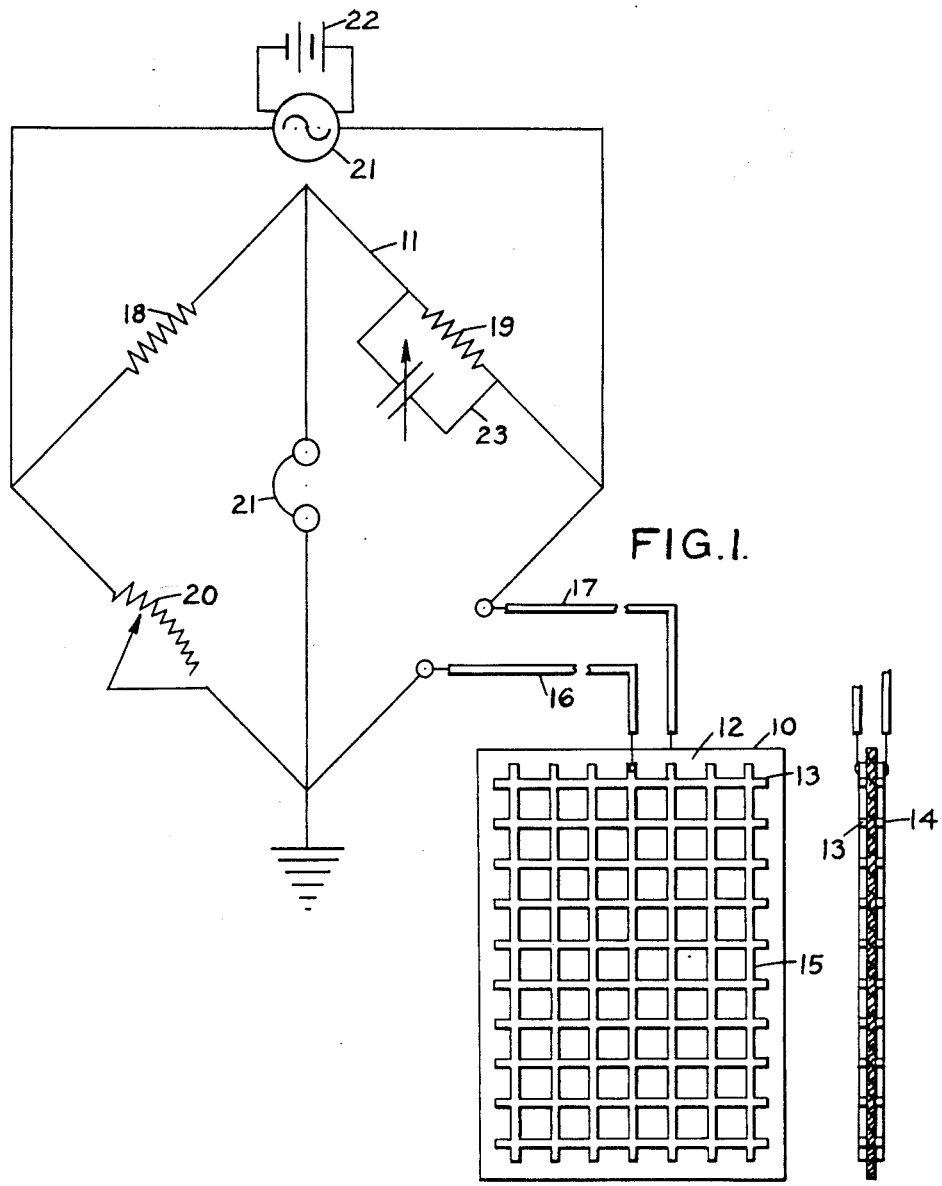
Figure 1 is a diagrammatic view of a resistance meter including a plan view of an absorption unit adapted to be imbedded in the soil.
Figure 2 is a side elevational view of the absorption unit shown in Figure 1.

In general, the invention comprises a moisture meter including an absorption unit and a resistance measuring unit electrically connected to the absorption unit. The operation of the entire meter is based upon the principle that the resistance of the absorption unit varies with the amount of moisture that it contains, and that the resistance has a constant relationship to the quantity of moisture contained therein. The absorption unit is adapted to be embedded in soil, the moisture content of which is to be determined, and the moisture content of the absorption unit bears a fixed relation to the quantity of moisture in the soil.

The absorption unit illustrated in the drawings comprises a rectangular sheet of a fabric of relatively light gauge which forms a dielectric 12. The dielectric is a woven fabric, the fibers of which are non-absorbent, but which are close enough together to hold moisture by capillary attraction. The dielectric shown is preferably a woven nylon fabric. On opposite sides of the dielectric 12 are electrodes 13 and 14. The electrodes are identical and preferably are stamped from sheets of nickel or similar conductive metal which is relatively resistant to corrosion. The electrodes are in the form of foraminate sheets having rectangular openings 15 formed therein. These openings may vary in size from ¼" to ½" square. The electrodes are preferably cemented to the dielectric adjacent the periphery of the latter. No cement is applied to either the electrodes or the dielectric intermediate the edges thereof, thereby permitting the dielectric to absorb moisture readily.

Both electrodes 13 and 14 are connected by suitable conductors 16 and 17 to the resistance measuring unit 11. The resistance measuring unit may be in any suitable form that is capable of accurate readings. Preferably the unit is in the form of a special type of Wheatstone bridge, such as that shown in Figure 1. The bridge may be a skeleton type, such as might be used in the laboratory, or it may be suitably enclosed in a container and provided with operating knobs and graduated dials. Whichever form the bridge takes, its basic essentials are the same.

The bridge comprises two identical fixed resistances 18 and 19 arranged in two opposite legs of the bridge. A variable resistance 20 is connected in parallel with the resistance 18. The resistance 20 is preferably a logarithmic potentiometric rheostat, and may be provided with a graduated dial. For usual soil moisture measurements the rheostat 20 should be variable between 5 and 5,000,000 ohms. A pair of standard earphones 21 are connected across the bridge.

In order to determine various resistances of the absorption unit, a high frequency oscillator is provided. This oscillator may take the form of a simple vacuum tube 21 connected to a source of current 22. By using a high frequency alternating current on the bridge, difficulties heretofore encountered by the use of direct current, such as polarization and electrolysis, are eliminated.

The absorption unit is connected to the fourth leg of the Wheatstone bridge, as shown in Figure 1. Its resistance is determined by the amount of moisture which it contains and which is dependent upon the quantity of moisture in the soil, as will be more fully pointed out hereinafter. In order to balance out any capacitance, a variable condenser 23 is connected in parallel with the resistance 19.

Obviously when the nylon fabric forming the dielectric 12 of the absorption unit is completely dry, the resistance of the unit will be extremely high. However, when the fabric contains any moisture the resistance of the unit will be substantially lower. When the unit is completely saturated its resistance will be substantially zero.

In using the apparatus, the absorption unit is embedded in the soil at a point where readings are to be taken. The resistance of the absorption unit can then be measured periodically. The resistance of the absorption unit will, of course, depend on the quantity of moisture taken up by the absorption unit from the soil. Each different resistance of the absorption unit will indicate a specific percentage of saturation of the soil in question.

It is, of course, necessary that the apparatus be calibrated in order that the percentage of moisture in the soil can be readily determined. One way of calibrating the instrument is to place a thin layer of soil, preferably approximately $\frac{3}{16}$ inch deep, in the bottom of a suitable pan, lay the absorption unit thereon, and then fill the pan with more soil, compacting the same so as to give a good contact between the soil and the absorption unit. The soil is then saturated with distilled water and the resistance of the absorption unit measured. The resistance of the absorption unit may decrease for a short time, but eventually will become static. It is then known that the moisture of the soil and the moisture in the absorption unit are in equilibrium. A sample of the soil immediately above and immediately below the absorption unit is then removed from the pan and weighed. This sample is then oven dried and again weighed, and from the difference in weight the percentage of moisture contained in the soil can be determined.

By repeating this procedure with the soil in various stages of dryness, a plurality of different resistances are obtained. If these are plotted on a chart, a curve will be produced by means of which other resistances can be determined and corresponding soil moisture contents also found.

In determining the resistance at any predetermined time, the variable condenser 23 and the variable resistance 20 are regulated until a definite null point is reached, as heard in the earphones.

Figures 3, 4:
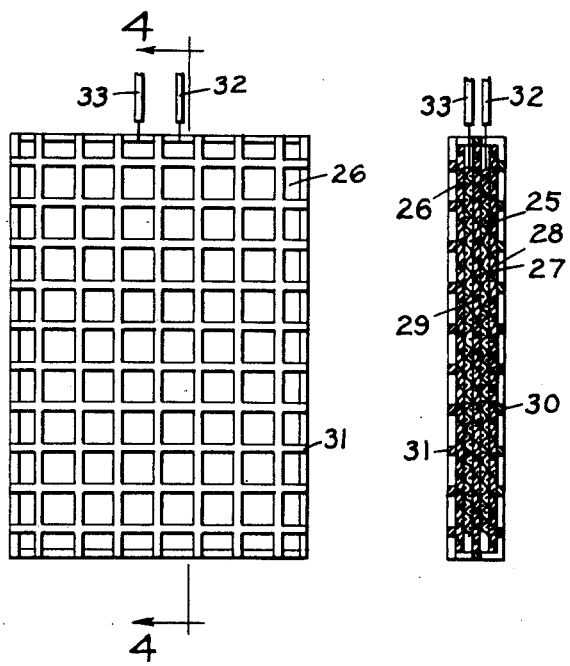
Figure 3 is a side elevational view of a modiged form of the present invention.
Figure 4 is a cross-sectional view taken on substantially the line 4—4 of Figure 3.

Figures 3 and 4 illustrate a modified form of the absorption unit. This absorption unit can be connected to a Wheatstone bridge in the same manner and of exactly the same character as that shown in Figure 1.

The unit comprises a pair of electrodes 25 and 26 made of small rectangular pieces of fine stainless steel screen. A pair of leads 32 and 33 are silver soldered to the two electrodes. The electrodes are separated from each other by a piece of nylon fabric 27 similar to that previously described and introduced between the two electrodes. Preferably the nylon dielectric is large enough so that one end can be introduced between the two electrodes, completely separating them, and then wrapped around the outside of both electrodes so as to completely encompass them, as at 28 and 29. It is not essential that a single sheet of nylon fabric be used. Instead three separate pieces, each a little larger than the area of the electrodes, may be employed. One piece would be placed between the electrodes and one on each of the outer sides of the two electrodes.

The electrodes 25 and 26 with the nylon dielectric 27, 28 and 29 are enclosed within a perforated case. Preferably the case is formed of thin sheet nickel provided with rectangular openings on the order of $\frac{1}{16}$ of an inch square and about $\frac{1}{4}$ inch on centers, so that approximately 64% of the area of the case is open. The case is preferably formed from a single piece of perforated nickel sheet slightly greater than twice the area of the electrodes. It is folded once intermediate its edges. The electrodes and dielectric are inserted between the folded portions of the case and the entire unit put under heavy pressure in a suitable press so as to flatten the unit and hold the parts in proper relationship to each other.

The leads 32 and 33 are connected to a Wheatstone bridge, such as that shown in Figure 1, in the same manner as the leads 16 and 17 shown in that figure. The unit is calibrated and used in exactly the same manner as the unit previously described, hence its description need not be repeated.

The advantage of the form of the invention shown in Figures 3 and 4 is that readings taken with it in the field always correspond very closely to readings obtained in the laboratory. This is not always true of the previous form because of certain soil conditions occasionally encountered in the field.

Since the present invention is utilized to measure moisture content of soils by measuring the flow of electricity between two electrodes, it is necessary in order to obtain accurate readings that the current flow from one electrode to the other only through the moisture contained within the unit. Occasionally where the electrodes are in contact with the soil, as in the case of the unit shown in Figures 1 and 2, a considerable quantity of electricity will flow from one electrode to the other through the soil itself rather than through the moisture contained within the dielectric located between the electrodes. Inaccurate readings will then result.

In the case of the modification of the invention shown in Figures 3 and 4, current must flow through the moisture contained within the dielectric because it encompasses as well as separates the two electrodes. Accordingly, readings taken in the field will always correspond very closely with readings obtained in the laboratory under accurately controlled conditions.

The nylon fabric utilized as a dielectric in connection with the absorption unit does not disintegrate due to the chemical action of minerals in soil used for growing plants. Neither does nylon absorb moisture itself. The moisture which is taken up by the dielectric is held solely by capillary action between the fibers of the dielectric. Thus, the calibration of the absorption unit remains constant. No ill effects due to hydrolysis or chemical action are apparent in the operation of the apparatus.

Instead of nylon, the dielectric 12 may be what is usually termed "fiber glass," or other non-absorbent insoluble fibrous material which will be durable when buried in the soil. Fiber glass is formed of glass filaments woven or compacted into a wool like structure. The glass does not absorb moisture, but the dielectric will hold water through its capillary attraction, the same as the nylon dielectric 12.

It will be seen that the foregoing invention provides a simple means for determining the moisture content of soil. It is not affected by chemical action of minerals found in most soils, and its calibration remains constant after continued use.

The scope of the invention is indicated in the appended claims.

I claim:

1. An absorption unit for use in a soil moisture meter comprising a pair of electrodes and a relatively thin dielectric layer interposed between said electrodes and in contact therewith, said dielectric being composed of closely spaced nylon fibers and being capable of holding moisture by capillary attraction.

2. An absorption unit for use in a soil moisture meter comprising a pair of electrodes, a relatively thin dielectric layer interposed between said electrodes and in contact therewith, and relatively thin dielectric layers located outside of said electrodes and entirely enclosing the same, said dielectric layers being composed of closely spaced nylon fibers and being capable of holding moisture by capillary attraction.

3. An absorption unit for use in a soil moisture meter comprising a pair of electrodes, a relatively thin dielectric layer interposed between said electrides and in contact therewith, and relatively thin dielectric layers located outside of said electrodes and entirely enclosing the same, said dielectric layers being composed of closely spaced nylon fibers and being capable of holding moisture by capillary attraction, and a perforated case of non-absorbent material tightly enclosing said electrodes and dielectric layers.

GEORGE BOUYOUCOS.

References Cited in the file of this patent

UNITED STATES PATENTS

| Number | Name | Date |
|---|---|---|
| 1,749,826 | Lubach | Mar. 11, 1930 |
| 1,781,153 | Allen | Nov. 11, 1930 |
| 2,047,638 | Kott | July 14, 1936 |
| 2,362,344 | Baver et al. | Nov. 7, 1944 |
| 2,526,636 | Colman | Oct. 24, 1950 |